No. 871,513. PATENTED NOV. 19, 1907.
C. A. LOHR.
ALTERNATING CURRENT MOTOR.
APPLICATION FILED SEPT. 7, 1905.
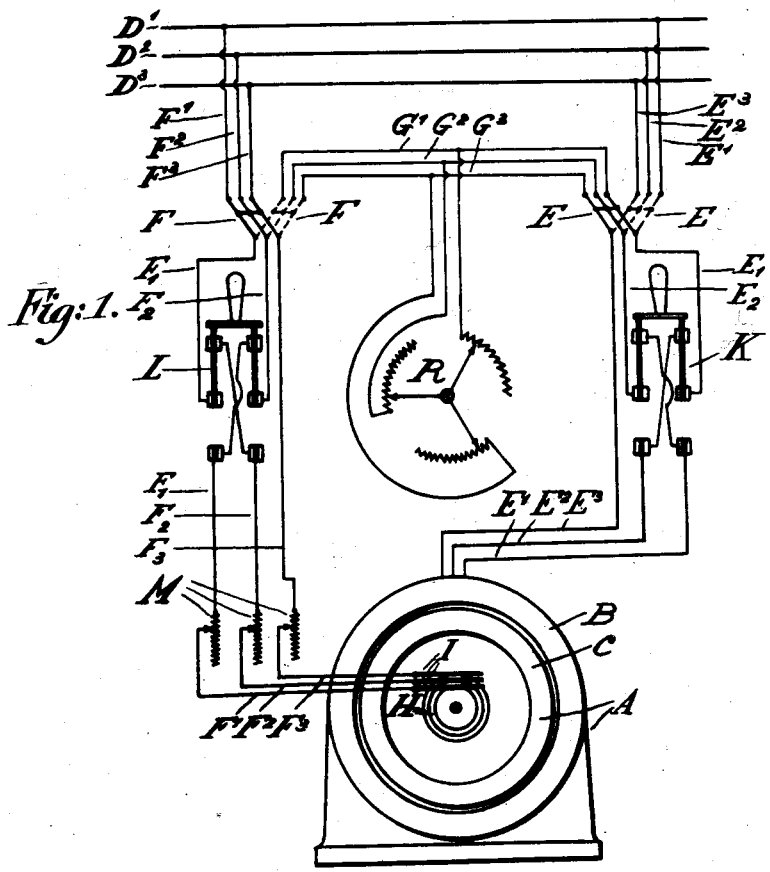
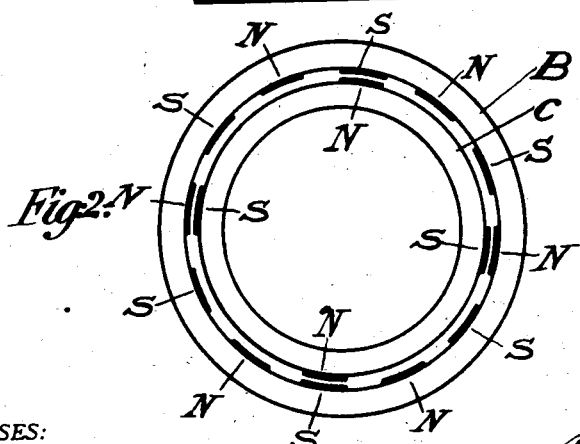
WITNESSES:
INVENTOR.
Carl A. Lohr
BY
ATTORNEYS.

UNITED STATES PATENT OFFICE.

CARL ALFRED LOHR, OF SCHENECTADY, NEW YORK.

ALTERNATING-CURRENT MOTOR.

No. 871,513.

Specification of Letters Patent.

Patented Nov. 19, 1907.

Application filed September 7, 1905. Serial No. 277,336.

*To all whom it may concern:*

Be it known that I, CARL ALFRED LOHR, a citizen of the Empire of Germany, residing in Schenectady, in the county of Schenectady and State of New York, have invented certain new and useful Improvements in Alternating-Current Motors, of which the following is a specification.

This invention relates to alternating current motors, and more particularly to rotary field motors in which alternating currents of different phases are used for generating a magnetic rotary field.

The object of my invention is to provide simple means of changing the speed of such motors and to do away with the changing of the number of poles or the use of different stators or rotors. For this purpose my invention consists of an alternating current motor, which is so arranged, that the speed of the same may be readily changed as will be more fully described hereinafter and finally pointed out in the claims.

In the accompanying drawing, Figure 1 shows a diagram of my improved motor showing the electrical connections used for changing the speed of the same, and Fig. 2 is a diagram of the stator and rotor of the same.

Similar letters of reference indicate the same parts in the different figures of the drawing.

Referring to the drawing A represents an alternating current motor, of which B shows the stator and C the rotor. $D^1$, $D^2$, $D^3$, are main conductors connected with a three-phase alternating current source, forming the networks. Connected with the networks are supply conductors $E^1$, $E^2$, $E^3$, which when in contact with the double-throw triple pole switch E serve to energize the stator. Connected with the alternating current source are three other supply conductors $F^1$, $F^2$, $F^3$, which when in contact with the double-throw triple pole switch F serve to energize the rotor. Auxiliary conductors $G^1$, $G^2$, $G^3$, have interposed therein a regulating resistance R, being properly connected with the conductors $G^1$, $G^2$, $G^3$, and thus connected with the switch E, when thrown as shown in the full drawn position of this switch, or connected with the switch F, when thrown as shown in the dotted position of this switch.

H represents the collector-rings of the motor, and I the brushes.

Interposed in the supply-conductors $E^1$, $E^2$, is a reversing-switch K, which serves to change the direction of rotation of the rotary field generated in the stator, when the switch E is properly thrown. Interposed in the supply-conductors $F^1$, $F^2$, is a reversing-switch L, which serves to change the direction of the rotary field generated in the rotor, when the switch F is properly thrown.

In order to illustrate the application of my invention in a broader scope, I have shown two reversing-switches K and L, which serve to produce the different motor-speeds in both directions, but I wish to be understood, that one of these reversing-switches may be left out, without departing from the spirit of my invention. These reversing-switches may also both be left out, when certain results of my invention are not desired.

The arrangement of my improved alternating current motor differs from the usual construction of the motors hitherto in use therein, that both parts of the motor generate rotary fields when supplied from the alternating current source. The speed of these rotary fields may be either the same or different. The speed may be different by the use of a different number of poles in the stator and rotor, as in the present invention, or by connecting the stator and rotor each with a source of electricity each having a different periodicity. Also the direction of rotation of the rotary fields in stator and rotor may be the same or different. Also two other cases are possible. Either to generate a rotary field in the stator and connect the rotor with the variable resistances R, as it is usually done, or connect the stator with the variable resistances R and connect the rotor with the current-supply. The motor will have a tendency in this case to run with a speed of the rotary field generated in the rotor, and will in the first case run with the speed of the rotary field generated in the stator.

Having for instance a stator of 36 poles and a rotor of 12 poles, then, by connecting both members of the motor with a source of three-phase alternating current of a frequency of 60 cycles per second, the speed of the stator-field will be 200 rotations per minute and that of the rotor-field 600 r. p. m.

When only the stator is connected with the line by means of having the switch E make connection with the conductors $E^1$, $E^2$, $E^3$, and the switch F is thrown so as to make connection with the conductors $G^1$, $G^2$, $G^3$, and thus connected with the variable resistances R, the motor will run asynchronously with the speed of the stator-field, that is, with 200 rotations per minute. When, however, only the rotor is connected with the line, that is, the switch F making connection with the conductors $F^1$, $F^2$, $F^3$, and the switch E thrown so as to make connection with the conductors $G^1$, $G^2$, $G^3$, and thus connected with the variable resistances R, as shown in the drawing by the full drawn position of the two switches E and F, then the motor will run asynchronously with the speed of the rotor-field, that is, with 600 rotations per minute. These two speeds of the motor are absolutely asynchronous, that is, by inserting resistance in the member not connected with the line, the speed may be varied or regulated to any desired speed below that of the rotary-field.

When both members, stator and rotor, are simultaneously connected with the line, that is, the switch E making connection with the conductors $E^1$, $E^2$, $E^3$, and the switch F making connection with the conductors $F^1$, $F^2$, $F^3$, and when the rotary fields are generated in opposite directions having properly thrown the reversing-switches K and L, then the motor will run synchronously with a speed equal to the sum of the rotary field speed, that is 800 rotations per minute. When the rotary fields in stator and rotor are generated so as to rotate in the same direction, having properly thrown the reversing-switches K and L, then the motor will run synchronously with a speed equal to the difference of the rotary field speeds, that is, 400 rotations per minute. Hence two principles are apparent: First. The generation of a magnetic rotary field in each of both members of a motor by simultaneously connecting both members of a motor, namely stator and rotor, with a source of alternating current, the motor acting then as synchronous motor. Second. The alternating connection of but one member of the motor with a source of alternating current, and the generation of a rotary field in the first named member, and the use of the other member of the motor as a part in which the currents necessary for producing a torque are induced. The motor acts then as asynchronous motor.

In the example of a motor having a stator with 36 poles and a rotor with 12 poles and an alternating current line of a periodicity of 60 cycles per second, the two speeds of 400 and 800 rotations per minute are synchronous and can frequently not be attained in a satisfactory way by making the proper connections when the motor is at rest. In order to derive these synchronous speeds by electrical means the following operations have to be made. The synchronous speed of 400 rotations per minute can be readily produced by forming first a similar case where the motor ran asynchronously with 600 r. p. m., namely by connecting only the rotor with the alternating current source. The synchronous speed of 800 r. p. m., as well as the one of 400 r. p. m., can be attained by connecting both members of the motor with the alternating current line, having resistances inserted in the supply-conductors of one of said members. These resistances can be short-circuited or switched out of circuit, when the motor has attained the desired synchronous speed. Furthermore the two synchronous speeds of 800 r. p. m. and of 400 r. p. m. can be electrically derived by producing first one of the asynchronous speeds, viz. 600 r. p. m. or 200 r. p. m., having only one member of the motor connected with the alternating current source, and then connecting also the other member of the motor first over resistances with the alternating current source and switching these resistances out of circuit when the motor has attained the desired synchronous speed. I have shown such resistances M in Fig. 1 of the drawing as being inserted in the supply-connections $F^1$, $F^2$, $F^3$, which connect the rotor C with the alternating current line when the switch F is properly thrown, but these resistances can also be inserted in the supply-connections $E^1$, $E^2$, $E^3$, which supply the stator with alternating currents when switch E is properly thrown. The purpose of these resistances M is to facilitate the change from an asynchronous to a synchronous speed and to secure a starting of the motor from rest up to one of the synchronous speeds. Additionally these resistances serve to equalize the field strengths in both members of the motor during the regular work as synchronous motor and to avoid cross-current flowing between the circuits of stator and rotor.

While I have explained the methods of obtaining a synchronous speed by supplying alternating currents to both members of a motor, when the numbers of poles in said members are different, I wish to be understood that these methods may also be employed when the numbers of poles in said members are the same, thus producing only one synchronous and one asynchronous speed in the ratio of two to one. In this case the synchronous speed may be obtained in the same way as explained for the higher synchronous speed of 800 r. p. m. in the cited example, or more precisely expressed in the following manner. The synchronous speed of a motor of the class described having the same number of poles in stator and rotor can be derived by connecting first only one member of said motor with the alternating current line, thus producing an asynchronous speed and then connecting also the other member with the alternating current line, having first resistances inserted, and gradually impressing a second rotary field upon the other member. Furthermore the synchronous speed of such motor may be obtained by connecting simultaneously both members with the alternating current line, having resistances inserted in the supply-connections to one member of said motor.

As for the ratio of numbers of poles in the two members of the motor—when different numbers have to be used—I have so far tacitly assumed that a ratio of one to three is feasible for both principles, viz. the generation of rotary fields in both members of the motor as well as the alternate connection of but one motor-member with an alternating current source.

To show the feasibility of this ratio of pole-numbers in the two motor-members in the manner described I refer to Fig. 2 of the drawing. In Fig. 2 I have shown a stator B having 12 poles, as represented by the heavy lines N and S (north and south poles) on the inner circumference of the stator and a rotor C having 4 poles similarly represented on the outer circumference of the rotor. The poles on both of these members are distributed around the circumference in equal distances from each other, and the poles of the one member have an angular pole-width equal to that of the other member. Thus it will be seen that with the ratio of one to three between the pole-numbers of both members the result is, that all poles of the rotor are facing opposite poles of the stator, while two thirds of the poles of the stator are left blank or inoperative.

The fact that opposite poles of stator and rotor are facing each other warrants a satisfactory operation as synchronous motor (Principle 1) and therefore *a priori* a satisfactory working as asynchronous motor (Principle 2). Relating, however, to the stator-poles which are left blank, naturally the question may arise whether these poles do not produce induction currents in the rotor of a frequency different from the line frequency, and whether these currents would not distort the wave-shape of the alternating currents in the line or in some way affect the satisfactory working of the motor. In fact, the blank stator-poles induce alternating voltages of a certain frequency, but no currents whatever can be produced thereby, as these induced voltages are always in opposition to each other and thus are entirely compensated. It would lead too far to fully explain the conditions which occur in the case of two magnetic fields of 12 and 4 poles, as shown in Fig. 2 of the drawing, and it may suffice to illustrate these conditions with a simple analogous case. This analogon may be found in a ring-armature with equally distributed turns, returning into themselves, or, in other words, an ordinary ring-armature without connections or brushes. Obviously, if such armature be rotated in a magnetic field of whatever number of poles, the induced voltages will annul each other, as no connections—neither stationary nor shifting—are provided at proper points of the armature-winding. Similar conditions are met with in the case shown in Fig. 2, and my previous assumption of a feasible ratio of poles of one to three in the two motor-members proves therefore as being correct. Furthermore, as for the ratio of the numbers of poles in the two motor-members, I wish to point out that a ratio of one to three is by no means the only possible ratio. Generally speaking, every different number of poles in the two motor-members will produce the proper motor-speeds, particularly the asynchronous speeds (Principle 2), but not in every case a satisfactory working of the motor. It is impossible, however, to exhaust in this specification all possibilities of feasible ratios between the pole-numbers of the two motor-members, especially as in this regard a wide field for improvements is open in devising special windings or special switching devices, which, as basing upon the principles given in this specification would naturally be in the scope of my invention.

The general application of my invention, therefore, as described in this specification, results in the following different types of alternating current motors: an alternating current motor, producing two speeds, one asynchronous, the other synchronous, by connecting alternately either one member alone or both members simultaneously with the alternating current line, and the method of deriving said synchronous speed as described. An alternating current motor, producing substantially a synchronous speed, by connecting both members simultaneously with the alternating current line, and the method of deriving said synchronous speed as described. These two types of alternating current motors are obtainable by employing the principles as described to a motor having the same number of poles in the two motor-members. By employing the principles as described to a motor having a different number of poles in the two motor-members, the following types of alternating current motors can be obtained: an alternating current motor producing two asynchronous speeds, obtainable under load, by alternately connecting only one member with the alternating current line and closing the other member upon itself. An alternating current motor producing two asynchronous and two synchronous speeds, by alternately connecting only one member with the alternating current line and closing the other member upon itself, and by simultaneously connecting both members with an alternating current line and changing the direction of rotation of the rotary field in one member and the method of deriving said two synchronous speeds as described. An alternating current motor, producing substantially a low synchronous speed, equal to the difference of the rotary field speeds in stator and rotor, and the method of deriving said synchronous speed as described.

Having thus described my invention, I claim as new and desire to secure by Letters Patent:

1. In combination with an alternating current rotary field motor having a stator and a rotor, said stator having a number of poles different from the number of poles of said rotor, means for electrically connecting at will said stator or said rotor to a source of electricity.

2. In combination with an alternating current rotary field motor having a stator and a rotor, said stator having a number of poles different from the number of poles of said rotor, means for electrically connecting at will said stator or said rotor to a source of electricity, means for closing the windings of said rotor upon themselves, when said stator is connected to said source of electricity, and means for closing the windings of said stator upon themselves when said rotor is connected to said source of electricity.

3. In combination with an alternating current rotary field motor having a stator and a rotor, said stator having a number of poles different from the number of poles of said rotor, means for electrically connecting at will either said stator or said rotor alone, or said stator and said rotor simultaneously to a source of electricity.

4. In combination with an alternating current rotary field motor having a stator and a rotor, said stator having a number of poles different from the number of poles of said rotor, means for connecting said stator and said rotor simultaneously to the same source of electricity.

5. In combination with an alternating current motor having two members, a stator and a rotor, means for producing a synchronous speed by simultaneously supplying alternating currents to both members of said motor, means for producing an asynchronous speed having only one of said members supplied by alternating currents and separate means for deriving said synchronous speed by weakening one of the rotary fields which produce said synchronous speed.

In testimony that I claim the foregoing as my invention, I have signed my name in presence of two subscribing witnesses.

CARL ALFRED LOHR.

Witnesses:
 HANS OTTO,
 A. G. BUECHNER.